US012225353B2

(12) United States Patent
Wang

(10) Patent No.: US 12,225,353 B2
(45) Date of Patent: Feb. 11, 2025

(54) HEARING DEVICE

(71) Applicant: Shanghai United Imaging Microelectronics Technology Co., Ltd., Shanghai (CN)

(72) Inventor: Fa Wang, Shanghai (CN)

(73) Assignee: Shanghai United Imaging Microelectronics Technology Co., Ltd., Shanghai (CN)

( * ) Notice: Subject to any disclaimer, the term of this patent is extended or adjusted under 35 U.S.C. 154(b) by 108 days.

(21) Appl. No.: 17/971,587

(22) Filed: Oct. 22, 2022

(65) Prior Publication Data

US 2023/0119844 A1 Apr. 20, 2023

(30) Foreign Application Priority Data

Dec. 17, 2021 (CN) ......................... 202111552142.5
Dec. 17, 2021 (CN) ......................... 202123187242.0

(51) Int. Cl.
*H04R 25/00* (2006.01)

(52) U.S. Cl.
CPC ......... *H04R 25/505* (2013.01); *H04R 25/305* (2013.01); *H04R 25/353* (2013.01); *H04R 2225/025* (2013.01)

(58) Field of Classification Search
CPC ...... H04R 25/30; H04R 29/00; H04R 25/505; H04R 25/305; H04R 25/353; H04R 2225/025
See application file for complete search history.

(56) References Cited

U.S. PATENT DOCUMENTS

2007/0036377 A1* 2/2007 Stirnemann .......... H04R 25/505 381/315
2010/0202642 A1* 8/2010 LoPresti ................ A61B 5/036 381/321
2014/0205127 A1* 7/2014 Khenkin ................ H04R 1/326 381/355
2019/0076058 A1* 3/2019 Piechowiak ............. A61B 5/12

FOREIGN PATENT DOCUMENTS

CN 109480846 A 3/2019
CN 112866890 A 5/2021
CN 112911487 A 6/2021
CN 113473286 A 10/2021
CN 217064005 U 7/2022

OTHER PUBLICATIONS

English machine translation of CN112911487 (Ting et al.; In-ear detection method for wireless earphone, wireless earphone and storage medium; published Jun. 2021) (Year: 2021).*
Chinese First Office Action (CN Application No. 2021115521425) , dated Feb. 6, 2024, 9 pages.

* cited by examiner

*Primary Examiner* — Mark Fischer

(57) ABSTRACT

A hearing device, including: a device body; a receiver, configured to emit an audio signal, the audio signal being reflected to form a feedback signal, and the proximal end of the device body being proximate to an ear canal; an in-ear microphone, arranged at a proximal end of the device body and configured to receive the feedback signal; and a signal analyzing module, connected to the in-ear microphone and configured to analyze the feedback signal to obtain an analysis result.

15 Claims, 7 Drawing Sheets

HEARING DEVICE

CROSS-REFERENCE TO RELATED APPLICATIONS

This application claims priority to Chinese patent application No. 202111552142.5, filed on Dec. 17, 2021 and entitled "Hearing Device", Chinese patent application No. 202123187242.0, filed on Dec. 17, 2021 and entitled "Hearing Device", the contents of which are hereby incorporated by reference in their entireties.

TECHNICAL FIELD

The present application relates to the technical field of acoustic devices, and in particular, to a hearing device.

BACKGROUND

A hearing aid is a small amplifier, which amplifies sound that is originally inaudible, then the sound is sent to the auditory center of the brain by using residual hearing, and the hearing-impaired feels the sound. The hearing aid brings a great convenience for the hearing impaired. A headphone includes a pair of conversion units, which receive electrical signals emitted from a media player or a receiver and convert the electrical signals into audible sound waves by speakers close to ears.

However, hearing devices such as hearing aids or earphones in the related technology do not have self-detection functions.

SUMMARY

In view of the above-mentioned defects in the related technology, it is necessary to provide a hearing device.

The present application provides a hearing device according to some embodiments, and the hearing device includes a receiver, an in-ear microphone, and a signal analyzing module.

The receiver is configured to emit an audio signal, and the audio signal is reflected to form a feedback signal.

An in-ear microphone is arranged at a proximal end of the device body and configured to receive the feedback signal, and the proximal end of the device body is proximate to an ear canal.

A signal analyzing module is connected to the in-ear microphone and configured to analyze the feedback signal to obtain an analysis result.

The hearing device of the above embodiment is provided with the in-ear microphone independent of an original microphone of the hearing device. Through the in-ear microphone, the feedback signal formed by the reflection of the audio signal may be received in the ear, which enables the signal analyzing module to analyze the feedback signal received in the ear. When the hearing device is worn, the in-ear microphone 20 is located in the ear, and the received feedback signal is different from the signal received by the original microphone of the hearing device, therefore, a large amount of information, which cannot be obtained by the original microphone of the hearing device, may be provided for the hearing device to analyze.

In one of the embodiments, the frequency of the audio signal is in a range of 50 Hz to 10 kHz, and/or the amplitude is lower than 20 dB.

In one of the embodiments, the audio signal includes an audio signal of a first preset frequency.

The audio signal reflected to form the feedback signal includes the audio signal of the first preset frequency being reflected by an eardrum to form a first feedback signal.

The signal analyzing module includes an in-ear-location detecting unit.

The signal analyzing module being configured to analyze the feedback signal to obtain the analysis result includes: the in-ear-location detecting unit being configured to analyze the first feedback signal to determine whether the hearing device is in an ear.

If the hearing device is placed in the ear, in the hearing device of the above embodiment, the audio signal of the first preset frequency emitted by the receiver is reflected by the eardrum to form the first feedback signal. The in-ear microphone of the hearing device may obtain the first feedback signal in the ear, so that the in-ear-location detecting unit may analyze the first feedback signal obtained by the in-ear microphone to determine whether the hearing device is in the ear. Compared with the hearing device receiving signals through the original microphone, the hearing device of the present application can collect the feedback signals better, thereby improving the accuracy of the in-ear-location detection.

In one of the embodiments, the hearing device further includes an application control module. The application control module is connected to the in-ear-location detecting unit, and configured to issue an application control instruction to a back-end circuit based on a judgement result of determining, by the in-ear-location detecting unit, whether the hearing device is in the ear.

In the hearing device of the above embodiment, the application control module may control an application based on a judgement result.

In one of the embodiments, the first feedback signal includes a standing wave.

The audio signal of the first preset frequency emitted by the hearing device of the above embodiment may be reflected by the eardrum to form the standing wave, and a dynamic range of the standing wave is less affected by a sealing degree of the ear canal, so the accuracy of the in-ear detection can be improved.

In one of the embodiments, the audio signal includes an audio signal of a second preset frequency.

The audio signal being reflected to form the feedback signal includes: the audio signal of the second preset frequency, when being transmitted to the in-ear microphone through the ear canal, generating a second feedback signal.

The signal analyzing module includes a feedback control unit.

The signal analyzing module being configured to analyze the feedback signal to obtain the analysis result includes: the feedback control unit being configured to determine a transfer function of a feedback path based on the second feedback signal.

The audio signal of the second preset frequency emitted by the hearing device of the above embodiment is transmitted through the ear canal to generate the second feedback signal, and the in-ear microphone of the hearing device may obtain the second feedback signal in the ear. Compared with the signals collected through the original microphone of the hearing device, the signal received and obtained by the present application needs a relatively short feedback path, thereby avoiding a problem of inaccurate estimation, improving the accuracy of the transfer function of the feedback path determined by the feedback control unit.

In one of the embodiments, the hearing device further includes an over-ear microphone.

The audio signal being reflected to form the feedback signal further includes: the audio signal of the second preset frequency, when being transmitted to the over-ear microphone through the ear canal, generating a sound feedback signal;

The in-ear microphone being configured to receive the feedback signal includes: the in-ear microphone being configured to receive the second feedback signal.

The over-ear microphone is configured to receive the sound feedback signal.

The feedback control unit being configured to determine the transfer function of the feedback path based on the second feedback signal includes: the feedback control unit being configured to estimate and determine the transfer function of the feedback path based on the second feedback signal received by the in-ear microphone and the sound feedback signal received by the over-ear microphone.

In one of the embodiments, the audio signal emitted by the receiver may include the audio signal of the second preset frequency. The audio signal of the second preset frequency, when being transmitted to the in-ear microphone through the ear canal, generates the second feedback signal, and the in-ear microphone obtains the second feedback signal. At the same time, the audio signal of the second preset frequency, when being transmitted to the over-ear microphone through the ear canal, generates the sound feedback signal, and the over-ear microphone obtains the sound feedback signal. Moreover, the signal analyzing module may include a feedback control unit. Based on the second feedback signal received by the in-ear microphone and the sound feedback signal received by the over-ear microphone, the feedback control unit may jointly estimate and determine the transfer function of the feedback path.

In one of the embodiments, the audio signal includes a frequency-sweep signal.

The audio signal being reflected to form the feedback signal includes: the frequency-sweep signal being reflected by the ear canal to form a third feedback signal.

The signal analyzing module includes the ear canal feature detecting unit.

The signal analyzing module being configured to analyze the feedback signal to obtain the analysis result includes: the ear canal feature detecting unit being configured to obtain ear canal feature information based on the third feedback signal.

The frequency-sweep signal emitted by the hearing device of the above embodiment is reflected by the ear canal to form the third feedback signal, and the in-ear microphone 20 of the hearing device obtains the third feedback signal in the ear, so that the ear canal feature detecting unit 303 may acquire the ear canal feature information based on the third feedback signal received by the in-ear microphone 20 in the ear, to analyze the shape of the ear canal.

In one of the embodiments, the ear canal feature information may include one or more of the shape of the ear canal, a volume of the ear canal, and the frequency response of the ear canal.

In one of the embodiments, the frequency-sweep signal includes scanning signals in multiple directions.

The scanning signals in multiple directions emitted by the hearing device of the embodiment above is reflected in the ear canal to form the third feedback signals in different directions. The in-ear microphone of the hearing device receives these third feedback signals in different directions in the ear, so that the ear canal feature detecting unit can analyze the feature information of the ear canal according to the third feedback signals in different directions received in the ear and can achieve a high accuracy.

In one of the embodiments, the signal analyzing module further includes an ear canal feature initializing unit.

The receiver initializing unit is connected to the receiver validity analyzing unit, and configured to optimize initial parameters of an adaptive algorithm according to a judgement result of the receiver validity analyzing unit.

The hearing device of the above embodiment can optimize the parameters of the adaptive algorithm according to the ear canal feature information by the ear canal feature initializing unit, and adjust the actual output of the receiver, thereby making the hearing device more suitable for the ear canal of each user, and improving hearing experience of the user.

In one of the embodiments, the frequency-sweep signal is emitted when the receiver is placed in an ear for the first time.

In one of the embodiments, the audio signal being reflected to form the feedback signal includes: the audio signal, when being transmitted to the in-ear microphone through the ear canal, generating a fourth feedback signal.

The signal analyzing module includes a receiver validity analyzing unit.

The signal analyzing module being configured to analyze the feedback signal to obtain the analysis result includes: the receiver validity analyzing unit being configured to obtain at least a first frequency response curve and a second frequency response curve according to the fourth feedback signal corresponding to a first time and the fourth feedback signal corresponding to a second time, respectively, to analyze the first frequency response curve and the second frequency response curve, and to determine whether the receiver is valid according to the analysis result.

The hearing device of the above embodiment may at least obtain the first frequency response curve according to the fourth feedback signal corresponding to the first time, and obtain the second frequency response curve according to the fourth feedback signal corresponding to the second time, thus realizing the validity analysis for the receiver 10 of the hearing device according to the first frequency response curve and the second frequency response curve.

In one of the embodiments, the receiver validity analyzing unit being configured to analyze the first frequency response curve and the second frequency response curve includes: the receiver validity analyzing unit being configured to perform a spectrum drift analysis according to the first frequency response curve and the second frequency response curve.

In one of the embodiments, the signal analyzing module further includes a receiver initializing unit.

The receiver initializing unit is connected to the receiver validity analyzing unit, and configured to optimize parameters of the adaptive algorithm according to a judgement result of the receiver validity analyzing unit.

In one of the embodiments, the hearing device further includes an over-ear microphone.

The audio signal, when being transmitted through a sound feedback path, generates a sound feedback signal.

The over-ear microphone is arranged at a distal end of the device body, and configured to receive the sound feedback signal.

The signal analyzing module is connected to the in-ear microphone and the over-ear microphone, respectively, and configured to analyze the feedback signal and the sound feedback signal to obtain another analysis result.

The hearing device of the above embodiment is provided with the in-ear microphone independent of the over-ear microphone of the hearing device. Through the in-ear microphone, the feedback signal formed by the reflection of the audio signal may be received in the ear, which enables the signal analyzing module to analyze the feedback signal received in the ear. When the hearing device is worn, the in-ear microphone is located in the ear, and the received feedback signal is different from the signal received by the original microphone of the hearing device, therefore, a large amount of information, which cannot be obtained by the over-ear microphone of the hearing device, may be provided for the hearing device to analyze, and the analysis result obtained is more accurate.

In one of the embodiments, the audio signal includes an audio signal of a preset frequency or a frequency-sweep signal.

In one of the embodiments, the signal analyzing module includes a processing unit and an analyzing unit.

The processing unit is connected to the in-ear microphone and the over-ear microphone, and is configured to digitally process the feedback signal collected by the in-ear microphone to obtain a feedback electrical signal, and is configured to digitally process the sound feedback signal collected by the over-ear microphone to obtain a sound feedback electrical signal.

The analyzing unit is connected to the processing unit, and is configured to analyze the feedback electrical signal and the sound feedback electrical signal to obtain the other analysis result.

In one of the embodiments, the hearing device further including an application control module, wherein the application control module is connected to the signal analyzing module, and is configured to issue an application control instruction to a back-end circuit according to the other analysis result of the signal analyzing module.

In the hearing device of the above embodiment, the application control module may control an application based on the analysis result of the signal analyzing module.

In one of the embodiments, the in-ear microphone is fixed at a side of the receiver.

In one of the embodiments, the in-ear microphone includes a side-opened silicon microphone.

The side-opened silicon microphone is fixed at the side of the receiver, and a facing direction of a sound hole of the side-opened silicon microphone and a facing direction of a sound hole of the receiver are identical.

In one of the embodiments, the hearing device further includes an acoustic tube, the in-ear microphone and the receiver are both connected to the acoustic tube.

The in-ear microphone and the receiver are both encapsulated in an encapsulating structure. The encapsulating structure has an opening, and the sound hole of the side-opened silicon microphone and the sound hole of the receiver both face the opening.

In one of the embodiments, the receiver is a moving-iron receiver.

In one of the embodiments, the over-ear microphone includes a first over-ear microphone and a second over-ear microphone.

The first over-ear microphone and the second over-ear microphone are both connected to the signal analyzing module.

In one of the embodiments, the audio signal transmitted through a feedback path is compensated by a first state probability parameter to obtain the feedback signal.

The audio signal transmitted through the sound feedback path is compensated by a second state probability parameter to obtain the sound feedback signal.

In one of the embodiments, the application control module includes a controller configured to issue an application control instruction to the back-end circuit.

In the hearing device of the embodiment above, the receiver initializing unit may optimize the parameters of the adaptive algorithm according to the judgement result of the receiver validity analyzing unit, and may, according to an offset of the frequency response of the receiver, make the same correction to output signals of the receiver to compensate the offset of the frequency response of the receiver, so as to avoid a reduction in the gain of the hearing device.

BRIEF DESCRIPTION OF THE DRAWINGS

In order to describe the technical solutions in the embodiments of the present application or in the related technology more clearly, the accompanying drawings needed to be used for the description of the embodiments or the related technology will be briefly introduced. Obviously, the accompanying drawings described hereinafter are merely some embodiments of the present application, and for those of ordinary skill in the art, other drawings may be obtained according to these accompanying drawings without creative work.

REFERENCE NUMERALS

Figure 1:
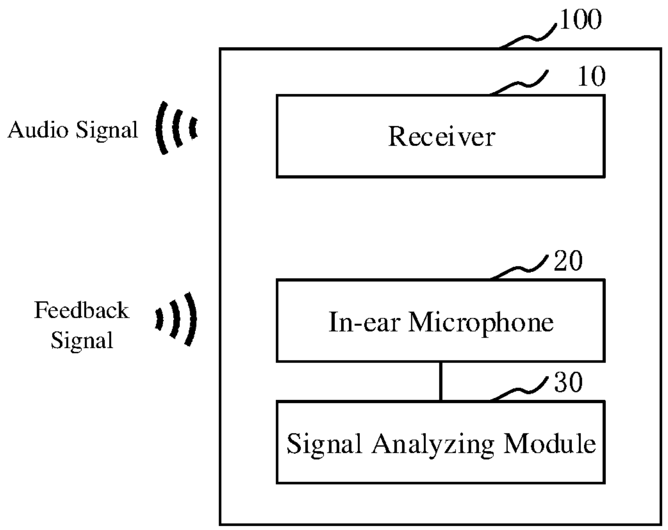
FIG. 1 is a schematic structural view showing a hearing device according to one of embodiments of the present application.

10. receiver; 20. in-ear microphone; 30. signal analyzing module; 301. in-ear-location detecting unit; 302. feedback control unit; 303. ear canal feature detecting unit; 304. ear canal feature initializing unit; 305. receiver validity analyzing unit; 306. receiver initializing unit; 307. feedback inhibition initializing unit; 40. application control module; 50. over-ear microphone; 60. acoustic tube; 70. packaging structure; 3001. processing unit; 3002. analyzing unit.

DETAILED DESCRIPTION OF THE EMBODIMENTS

In order to facilitate understanding the present application, the present application will be described more fully herein with reference to the related drawings. Embodiments of the present application are shown in the accompanying drawings. However, the present application may be implemented in various forms and is not limited to the embodiments described herein. On the contrary, these embodiments are provided to make the present application to be disclosed more thoroughly and completely.

Unless otherwise defined, all technical and scientific terms used herein have the same meanings as those commonly understood by those skilled in the art to which the present invention belongs. The terms used in the description of the present invention is only for the purpose of describing particular embodiments and is not intended to limit the invention.

It may be understood that the terms “first”, “second”, etc. in the present disclosure may be used to describe various features, but these features are not limited by these terms. These terms are only used to distinguish one characteristic from another. For example, without departing from the scope of the present application, the audio signal of the first preset frequency may be defined as the audio signal of the second preset frequency, and similarly, the audio signal of the second preset frequency may be defined as the audio signal of the first preset frequency. The audio signal of the first preset frequency and the audio signal of the second preset frequency are both audio signals, but the preset frequencies thereof are different.

It may be understood that the “connection” in the following embodiments should be understood as “electrical connection”, “communication connection” and the like if there are electrical signals or data transmission between the connected circuits, modules, units, etc.

As used herein, the terms “a”, “an”, and “the/this” of the singular form may include those of the plural form as well, unless otherwise described clearly in the context. It should also be understood that, the terms “comprise/include”, “have” or any other variation thereof, which defines the existence of a feature, an entirety, a step, an operation, an assembly, a part, or a combination thereof, are intended to cover a non-exclusive inclusion of possibility of one or more other features, entireties, steps, operations, assemblies, parts, or combinations thereof. Moreover, the terms “and/or” used in the specification may include any combinations of the items listed above.

At present, the hearing devices such as hearing aids or earphones in the related technology do not have a self-detection function.

In view of this, the present application provides a hearing device according to some embodiments. The hearing device acquires a large amount of information by arranging a microphone adjacent to a receiver to realize parameter optimization and/or other functions.

The hearing device of the present application may include, but is not limited to, a hearing aid, an earphone of pass-through mode, or any other in-ear device, etc. A shape, a length, a width, a thickness, a material, etc. of the hearing device may have different implementations based on actual application scenes, and will not be described in detail in the embodiments of the present application.

Referring to FIG. 1, the hearing device includes a device body 100, a receiver 10, an in-ear microphone 20, and a signal analyzing module 30. The receiver 10 is configured to emit an audio signal, and the audio signal is reflected to form a feedback signal. The in-ear microphone 20 is arranged at a proximal end of the device body 100, and configured to receive the feedback signal. The signal analyzing module 30 is connected to the in-ear microphone 20 and configured to analyze the feedback signal to obtain an analysis result. The connection between the signal analyzing module 30 and the in-ear microphone 20 is an electrical connection or a communication connection. The communication connection is a wireless connection realized by, for example, Bluetooth or WLAN, etc.

In an embodiment, the device body 100 includes a casing, and the casing is a ceramic material. In an embodiment, a process of manufacturing the casing includes: acquiring an inner structure of the user’s ear and/or a configuration scheme; calculating structure parameters of the casing based on the inner structure of the user’s ear and/or the configuration scheme; obtaining parameters of a ceramic green body according to at least one type of parameters of hearing aid parameters, process parameters, and ceramic material parameters; and obtaining the ceramic green body by using 3D printing technology, and firing the ceramic green body to obtain the casing. The ceramic material parameters characterize a size change of the ceramic green body in a firing process.

In an embodiment, the device body 100 further includes an earplug with a porous structure, and at least one of the receiver 10, the in-ear microphone 20, and the signal analyzing module 30 may be located inside or near the earplug. All or part of apertures in the porous structure communicate with adjacent apertures, which can balance the air pressure inside and outside the ear and prevent whistling. The porous structure also contributes to improvement of softness of the earbud, which helps the earbud fit the skin snugly and improves comfort. Further, the porous structure is a lattice structure, which is composed of a unit cell array, including a plurality of unit cells. Further, a size of the aperture of the porous structure gradually decreases from the proximal end to the distal end. Further, sizes, a density, locations of the apertures, etc., may be designed according to user’s information.

The device body 100 also includes a bluetooth antenna, and the bluetooth antenna is located at the distal end and at the user’s antilobium, and may be shielded by the antilobium while in a wearing state, thereby improving concealment of the hearing device.

The hearing device of the above embodiment is provided with the in-ear microphone 20 independent of an original microphone of the hearing device. Through the in-ear microphone 20, the feedback signal formed by the reflection of the audio signal may be received in the ear, which enables the signal analyzing module 30 to analyze the feedback signal received in the ear. When the hearing device is worn, the in-ear microphone 20 is located in the ear, and the received feedback signal is different from the signal received by the original microphone of the hearing device, therefore, a large amount of information, which cannot be obtained by the original microphone of the hearing device, may be provided for the hearing device to analyze.

It should be noted that frequencies and amplitudes of the audio signal are not limited in the embodiment of the present application. In one of the embodiments, the frequency of the audio signal is in a range of 50 Hz to 10 kHz, and/or the amplitude is lower than 20 dB. That is, the audio signal may satisfy that the frequency is in the range of 50 Hz to 10 kHz, or that the amplitude is lower than 20 dB, or that the frequency is in the range of 50 Hz to 10 kHz and the amplitude is lower than 20 dB.

Some possible embodiments of the present application will be specifically described hereinafter with reference to FIG. 2 and FIG. 3, by taking the hearing device that implements an in-ear-location detection function through the in-ear microphone 20 as an example.

In one of the embodiments, the audio signal emitted by the receiver 10 includes an audio signal of a first preset frequency. The audio signal of the first preset frequency is reflected by eardrum to form a first feedback signal. Moreover, the signal analyzing module 30 may include an in-ear-location detecting unit 301, and the in-ear-location detecting unit 301 is configured to analyze the first feedback signal to determine whether the hearing device is in the ear.

Figure 3:
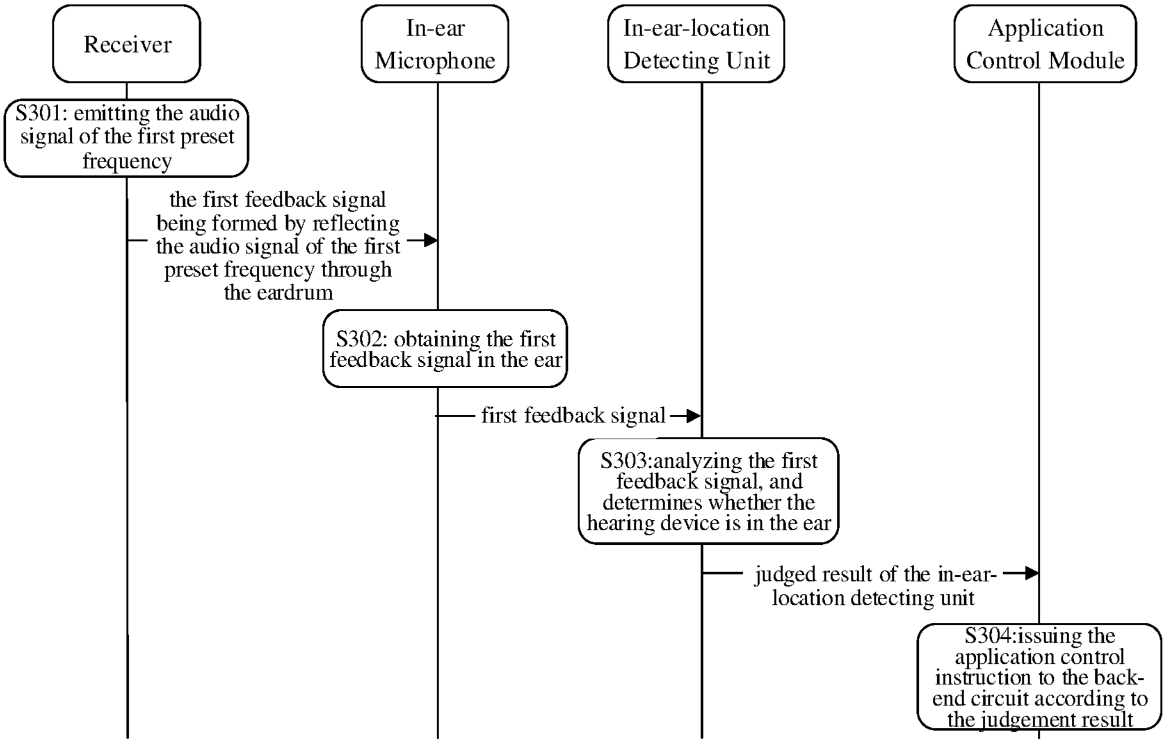
FIG. 3 is a schematic view showing a working process of implementing an in-ear-location detection function by the hearing device according to one of the embodiments of the present application.

If the hearing device is placed in the ear, as shown in FIG. 3, in the hearing device of the above embodiment, the audio signal of the first preset frequency emitted by the receiver 10 is reflected by the eardrum to form the first feedback signal. The in-ear microphone 20 of the hearing device may obtain the first feedback signal in the ear, so that the in-ear-location detecting unit 301 may analyze the first feedback signal obtained by the in-ear microphone to determine whether the hearing device is in the ear. Compared with the hearing device receiving signals through the original microphone, the hearing device of the present application can collect the feedback signals better, thereby improving the accuracy of the in-ear-location detection.

Optionally, the audio signal of the first preset frequency is a weak audio signal. The magnitude of the first preset frequency is related to geometry shapes of ear canals and/or of eardrums and elastic modulus of the eardrums of different individuals, and a mean of the values in the human hearing range may be used as a basis of a simulation or a basis of some other algorithms, to calculate a range of the first preset frequency. In the present application, the magnitude of the first preset frequency may be adjusted finely according to individual differences. In one embodiment, the frequency of the audio signal of the first preset frequency is in a range of 50 Hz to 10 kHz, and the amplitude is lower than 20 dB.

The receiver 10 in an off-ear state may emit the audio signal at the first preset frequency. When the receiver 10 is placed in the ear, the audio signal of the first preset frequency may be reflected by the eardrum to form the first feedback signal. The receiver 10 may continuously emit the audio signal at the first preset frequency, or may regularly emit the audio signal at the first preset frequency and continuously send the audio signal for a preset time period, which is not limited in the present application.

In the present application, the specific method, by which the in-ear-location detecting unit 301 analyzes the first feedback signal and judges whether the hearing device is in the ear, is not limited. In one of the embodiments, the in-ear-location detecting unit 301 may compare the first feedback signal with a reflection signal formed in the off-ear state by the reflection of the audio signal of the first preset frequency, so as to determine whether the hearing device is in the ear. In one of the embodiments, the in-ear-location detecting unit 301 may compare the first feedback signal with a preset feedback signal threshold to determine whether the hearing device is in the ear.

In addition, in some possible embodiments, the in-ear-location detecting unit 301 may also determine whether the hearing device is correctly worn according to an energy value of the first feedback signal received in the ear. For example, when the hearing device is correctly worn, the receiver 10 is placed in the ear, and a range of the energy value of the first feedback signal, formed by reflecting the audio signal of the first preset frequency through the eardrum, is defined as a standard feedback range. During an in-ear-location detection, if the in-ear-location detecting unit 301 detects that the energy value of the first feedback signal is beyond the standard feedback range, it is determined that the hearing device is not correctly worn at this time.

Referring to FIG. 2 again, in one of the embodiments, the hearing device may further include an application control module 40. The application control module 40 is connected to the in-ear-location detecting unit 301 of the signal analyzing module 30 and configured to issue an application control instruction to a back-end circuit based on a judgement result of the in-ear-location detecting unit 301.

In the hearing device of the above embodiment, the application control module 40 may control an application based on a judgement result.

Referring to FIG. 3 again, a working process of implementing the in-ear detection function of the hearing device of one of the embodiments of the present application may include the following steps S301 to S304.

At step S301, the receiver 10 emits the audio signal of the first preset frequency.

At step S302, the in-ear microphone 20 obtains the first feedback signal in the ear, and the first feedback signal is formed by reflecting the audio signal of the first preset frequency through the eardrum.

At step S303, the in-ear-location detecting unit 301 analyzes the first feedback signal, and determines whether the hearing device is in the ear.

At step S304, the application control module 40 issues the application control instruction to the back-end circuit according to the judgement result of the in-ear-location detecting unit 301.

It can be understood that a specific form of the first feedback signal is not limited in the present application. In one of the embodiments, the first feedback signal formed by reflecting through the eardrum may include a standing wave.

The audio signal of the first preset frequency emitted by the hearing device of the above embodiment may be reflected by the eardrum to form the standing wave, and a dynamic range of the standing wave is less affected by a sealing degree of the ear canal, so the accuracy of the in-ear detection can be improved.

After the hearing device is worn, because it is difficult for an ear cap to be in a tight contact with the ear canal, the audio signal emitted from the receiver 10 located in the ear may leak from a gap, and then is collected by the original external microphone of the hearing device to enter a system. A sound feedback path (also called "feedback path") refers to a space path, through which the audio signal emitted from the receiver 10 located in the ear goes to an original external microphone of the hearing device. To estimate the sound feedback path, the audio signal emitted from the receiver and the signal collected by the original external microphone of the hearing device need to be known, and a ratio of the audio signal emitted by the receiver to the signal collected by the original external microphone is a transfer function of the sound feedback path. In the related technology, the audio signal emitted from the receiver is generally estimated by a driving signal of the receiver. However, due to a nonlinear relationship between the driving signal of the receiver 10 and the audio signal emitted by the receiver 10, and due to the relative long feedback path, a problem of inaccurate estimation may easily occur, which will affect the feedback inhibition effect.

Some possible embodiments of the present application will be specifically described hereinafter with reference to FIG. 2 and FIG. 4, by taking the hearing device that estimates a transfer function of the feedback path through the in-ear microphone 20 as an example.

In some of the embodiments, the audio signal emitted by the receiver 10 includes an audio signal of a second preset frequency. The audio signal of the second preset frequency is transmitted through the ear canal to generate a second feedback signal. Moreover, the signal analyzing module 30 may include a feedback control unit 302, and the feedback control unit 302 may determine the transfer function of the feedback path based on the second feedback signal.

The audio signal of the second preset frequency emitted by the hearing device of the above embodiment is transmitted through the ear canal to generate the second feedback signal, and the in-ear microphone 20 of the hearing device may obtain the second feedback signal in the ear. Compared with the signals collected through the original microphone of the hearing device, it requires a relatively short feedback path to receive the feedback signal in this embodiment, thereby avoiding inaccurate estimation, improving the accuracy of the transfer function of the feedback path determined by the feedback control unit 302, and reducing an error.

Optionally, the audio signal of the second preset frequency may be emitted by the receiver 10 during a normal operation.

Figure 4:
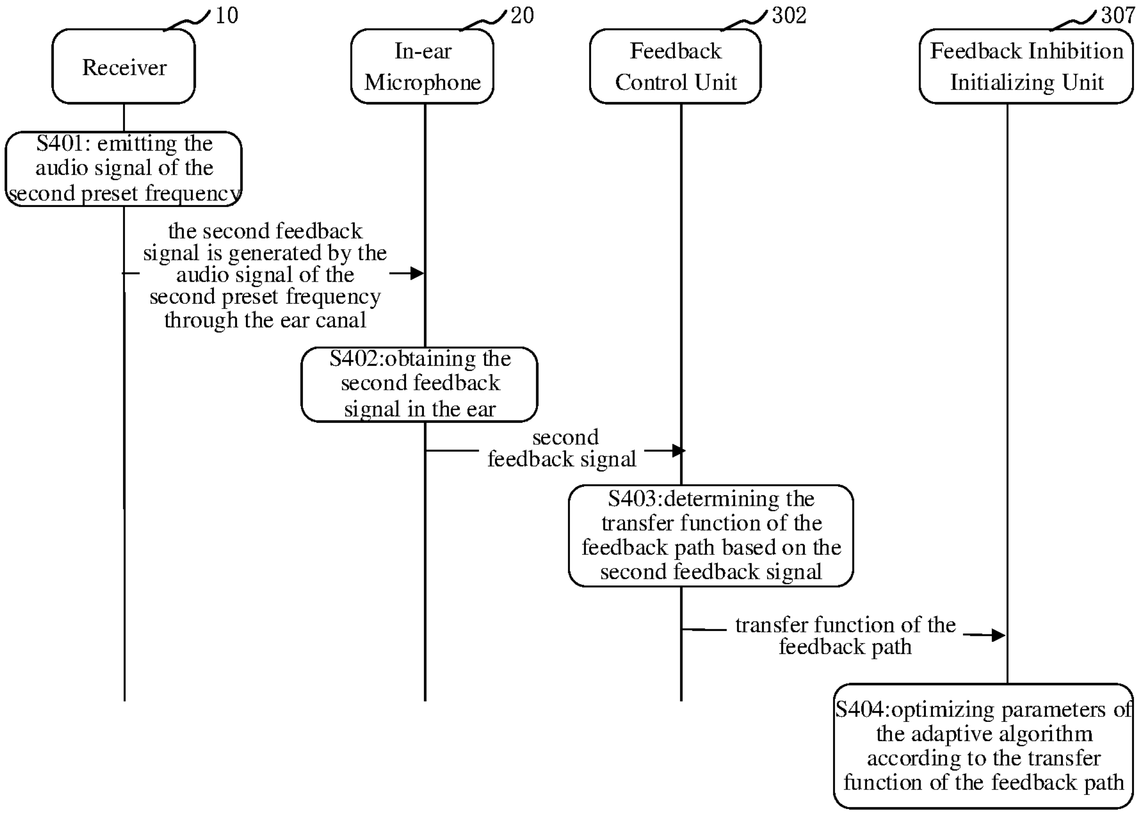
FIG. 4 is a schematic view showing a working process of determining a transfer function of a feedback path by the hearing device according to one of the embodiments of the present application.

Referring to FIG. 4, in the hearing device of the above embodiment, the audio signal of the second preset frequency emitted by the receiver 10 is transmitted through the ear canal to generate the second feedback signal, and the in-ear microphone 20 of the hearing device may receive the second feedback signal in the ear. Compared with the signals collected by the original microphone of the hearing device, it requires a relatively short feedback path to receive the feedback signal in this embodiment, thereby avoiding inaccurate estimation.

That is to say, in the hearing device of the above embodiment, the audio signal actually emitted by the receiver 10 is estimated based on the second feedback signal, which is acquired by the in-ear microphone 20 after the audio signal of the second preset frequency emitted by the receiver 10 is transmitted. The result obtained by such an estimation is more accurate, and eliminates a possible impact of nonlinear factors (such as a pulse density modulation driving, a digital-to-analog conversion and/or a D-typed amplifier, etc.) during estimation of the feedback path on the estimation of the feedback path.

In one of the embodiments, the hearing device further includes an over-ear microphone 50. In this case, the audio signal of the second preset frequency, when being transmitted to the in-ear microphone 20 through the ear canal, may generate the second feedback signal, and the in-ear microphone 20 obtains the second feedback signal. At the same time, the audio signal of the second preset frequency, when being transmitted to the over-ear microphone 50 through the ear canal, also generates the sound feedback signal, and the over-ear microphone 50 obtains the sound feedback signal. Based on both the second feedback signal received by the in-ear microphone 20 and the sound feedback signal received by the over-ear microphone 50, the feedback control unit 302 may estimate and determine the transfer function of the feedback path.

Specifically, since the in-ear microphone 20 is arranged to be adjacent to the receiver 10, the second feedback signal received by the in-ear microphone 20 in the ear may be regarded to be approximate to a real-time output signal of the receiver 10. The signal received by the over-ear microphone 50 is the sound feedback signal generated by the transmission of the audio signal of the second preset frequency when the audio signal of the second preset frequency passes through the sound feedback path of the ear canal. An analysis is performed by combining the second feedback signal with the sound feedback signal received by the over-ear microphone 50, thereby realizing a more accurate feedback inhibition function, and preventing the nonlinear relationship between the audio signal emitted by the receiver 10 and the driving signal of the receiver 10 from affecting the realization of the feedback inhibition function.

The circuit schematic diagram of the hearing device of one of the embodiments of the present application will be described in more detail hereinafter with reference to FIG. 4 and FIG. 5.

Figure 5:
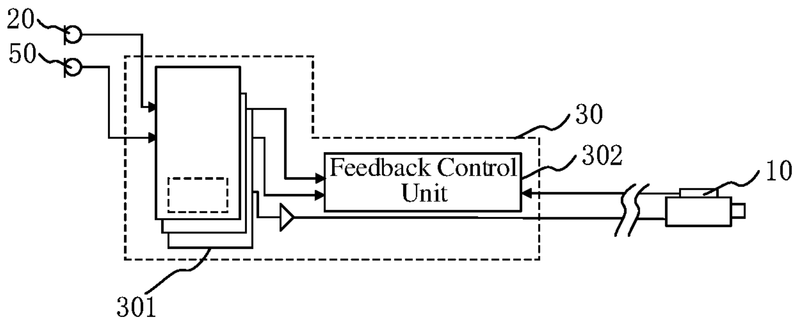
FIG. 5 is a circuit schematic diagram showing the hearing device according to one of the embodiments of the present application.

As shown in FIG. 5, the signal analyzing module 30 includes a feedback processing unit 301 and a feedback control unit 302. The feedback processing unit 301 is connected to the in-ear microphone 20 and the over-ear microphone 50. The feedback processing unit 301 is configured to digitally process the second feedback signal collected by the in-ear microphone 20 to obtain the second feedback electrical signal, and to digitally process the sound feedback signal collected by the over-ear microphone 50 to obtain the sound feedback electrical signal. The feedback control unit 302 is connected to the feedback processing unit 301, and is configured to estimate and obtain the transfer function of the feedback path based on both the second feedback electrical signal and the sound feedback electrical signal.

Regarding the feedback control unit 302, it should be noted that a specific method of analyzing the second feedback electrical signal and the sound feedback electrical signal by the feedback control unit 302 is not limited in the embodiment of the present application. The method of analyzing the second feedback electrical signal and the sound feedback electrical signal by the feedback control unit 302 may be understood by referring to the related technology, and will not be described in the present application again.

Referring to FIG. 2 again, in one of the embodiments, the signal analyzing module 30 may further include a feedback inhibition initializing unit 307. The feedback inhibition initializing unit 307 is connected to the feedback control unit 302, and is configured to optimize parameters of an adaptive algorithm according to the transfer function of the feedback path. The adaptive algorithm is, for example, a common algorithm used to optimize the transfer function of the feedback path. The transfer function of the feedback path is a function characterizing a ratio relationship of the feedback signal to the audio signal.

As shown in FIG. 4, in the hearing device of the embodiment above, the feedback inhibition initializing unit 307 may optimize parameters of the adaptive algorithm according to the transfer function of the feedback path, thereby realizing a more accurate feedback inhibition.

Referring to FIG. 4, in the hearing device of one of the embodiments of the present application, the working process of determining the transfer function of the feedback path may include the following steps S401 to S404.

At step S401, the receiver 10 emits the audio signal of the second preset frequency.

At step S402, the in-ear microphone 20 obtains the second feedback signal in the ear, and the second feedback signal is generated by transmission of the audio signal of the second preset frequency through the ear canal.

At step S403, the feedback control unit 302 determines the transfer function of the feedback path based on the second feedback signal.

At step S404, the feedback inhibition initializing unit 307 optimize the parameters of the adaptive algorithm according to the transfer function of the feedback path.

There are significant differences between the features of the ear canals of individuals, so a frequency response of the ear canal varies from person to person. Specifically, the ear canal and the eardrum theoretically constitute part of a front cavity of the receiver, so a geometric size, a shape and/or a bending direction of the ear canal will affect the actual output of the receiver 10, especially affect a high-frequency audio signal. By extracting the features of the ear canal when the hearing device is worn for the first time, the frequency responses of the ear canals of different users may be estimated, thereby providing a support for the personalized parameter configuration for the hearing device. It should be noted that the frequency response of the ear canal involved in the present application may refer to different characteristics of the frequency responses generated due to different shapes of the ear canal when the ear canal functions as the front cavity of the receiver.

Some possible embodiments of the present application will be specifically described hereinafter with reference to FIG. 2 and FIG. 6, by taking the hearing device that acquires ear canal feature information through the in-ear microphone 20 as an example.

In one of the embodiments, the audio signal emitted by the receiver 10 includes a frequency-sweep signal. The frequency-sweep signal is reflected by the ear canal to form a third feedback signal. Moreover, the signal analyzing module 30 may include an ear canal feature detecting unit 303. The ear canal feature detecting unit 303 is configured to acquire the ear canal feature information based on the third feedback signal.

The frequency-sweep signal emitted by the hearing device of the above embodiment is reflected by the ear canal to form the third feedback signal, and the in-ear microphone 20 of the hearing device obtains the third feedback signal in the ear, so that the ear canal feature detecting unit 303 may acquire the ear canal feature information based on the third feedback signal received by the in-ear microphone 20 in the ear, to analyze the shape of the ear canal.

It may be understood that specific types of the ear canal feature information are not limited in the present application. The ear canal feature information involved in the embodiment of the present application may include, but is not limited to, one or more of the geometric size of the ear canal, the shape of the ear canal, the bending direction of the ear canal, a volume of the ear canal, and the frequency response of the ear canal, etc.

It should be noted that the frequency-sweep signal involved in the embodiment of the present application may include an audio signal, which is designed for testing purpose and is in a preset frequency band, and the frequency of the audio signal continuously changes from high to low, or from low to high. A specific range of the preset frequency band is not limited in the embodiment of the present application. In one of the embodiments, the preset frequency band ranges from 50 Hz to 10 kHz, and the amplitude is lower than 20 dB.

In one of the embodiments, the frequency-sweep signal emitted by the receiver 10 includes scanning signals in multiple directions.

The scanning signals in multiple directions emitted by the hearing device of the embodiment above are reflected in the ear canal to form the third feedback signals in different directions. The in-ear microphone 20 of the hearing device receives these third feedback signals in different directions in the ear, so that the ear canal feature detecting unit 303 can analyze the feature information of the ear canal according to the third feedback signals in different directions received in the ear and can achieve a high accuracy.

Referring to FIG. 2 again, on the basis of the above embodiment, optionally, the signal analyzing module 30 may further include an ear canal feature initializing unit 304. The ear canal feature initializing unit 304 is connected to the ear canal feature detecting unit 303, and is configured to optimize the parameters of the adaptive algorithm according to the ear canal feature information.

Figure 6:
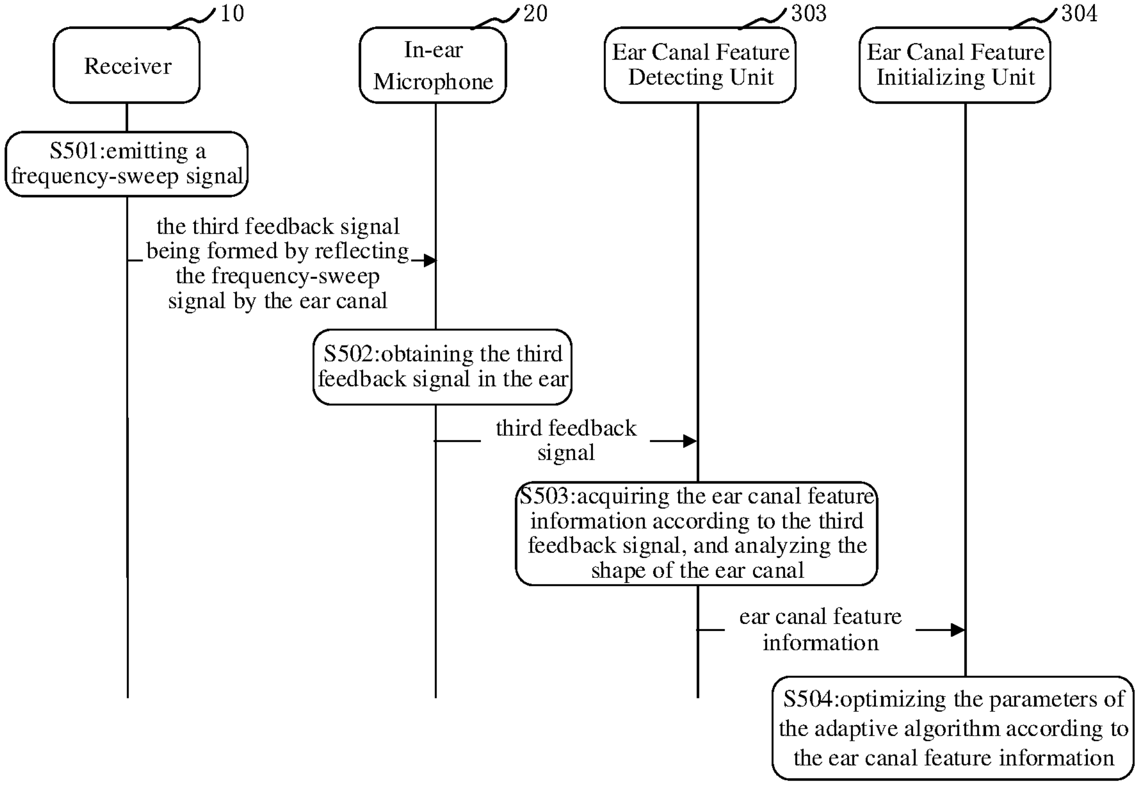
FIG. 6 is a schematic view showing a working process of acquiring ear canal feature information by the hearing device according to one of the embodiments of the present application.

As shown in FIG. 6, the hearing device of the above embodiment can optimize the parameters of the adaptive algorithm according to the ear canal feature information by the ear canal feature initializing unit 304, and adjust the actual output of the receiver 10, thereby making the hearing device more suitable for the ear canal of each user, and improving hearing experience of the user.

Optionally, the frequency-sweep signal may be emitted by the receiver 10 when the hearing device is placed into the ear for the first time.

With the prolonged utility time, the receiver in the hearing device is easily deteriorated by corrosion of immersion liquid or damaged by collision due to external forces, thus resulting in a change in the frequency response of the receiver, resulting in a spectrum drift, affecting a resonant frequency, and further reducing a gain of the hearing device.

Referring to FIG. 6, in the hearing device of one of the embodiments of the present application, the process of calculating the ear canal feature information may include the following steps S501 to S504.

At step S501, the receiver 10 emits a frequency-sweep signal.

At step S502, the in-ear microphone 20 obtains the third feedback signal in the ear, and the third feedback signal is formed by reflecting the frequency-sweep signal by the ear canal.

At step S503, the ear canal feature detecting unit 303 acquires the ear canal feature information according to the third feedback signal, and analyzes the shape of the ear canal.

At step S504, the ear canal feature initializing unit 304 optimize the parameters of the adaptive algorithm according to the ear canal feature information.

Figure 2:
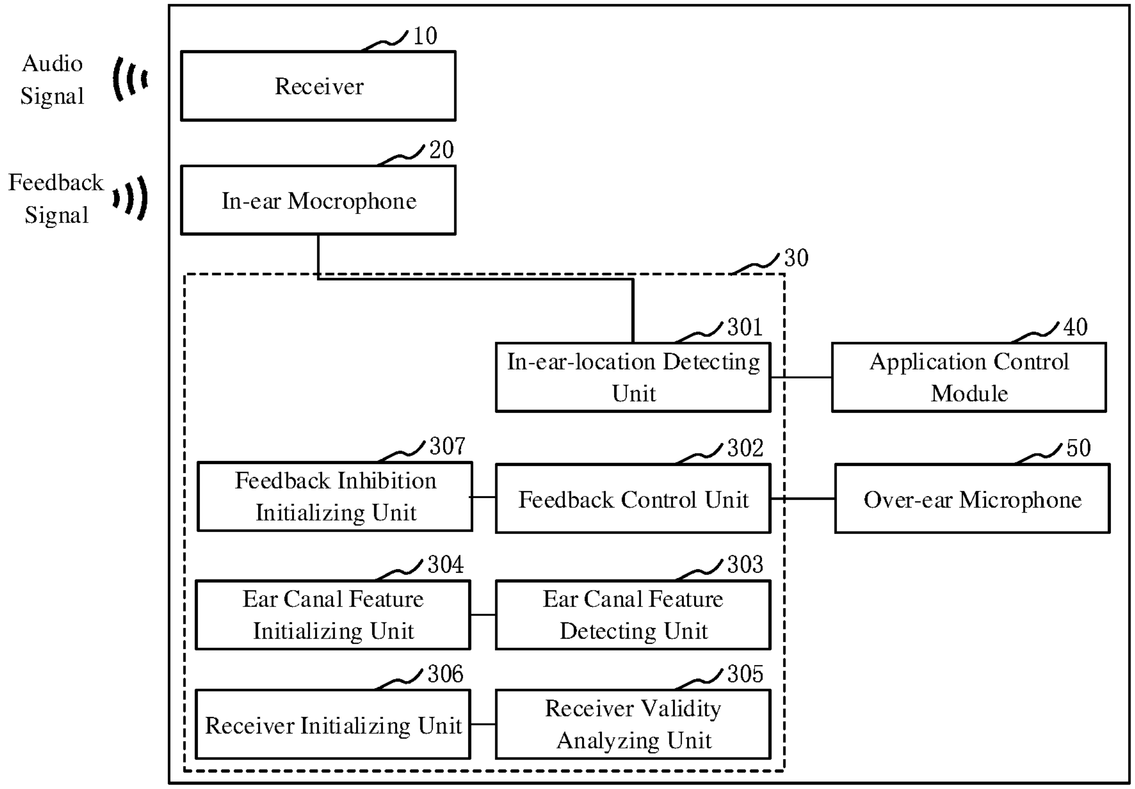
FIG. 2 is a schematic structural view showing the hearing device according to another embodiment of the present application.
Figure 7:
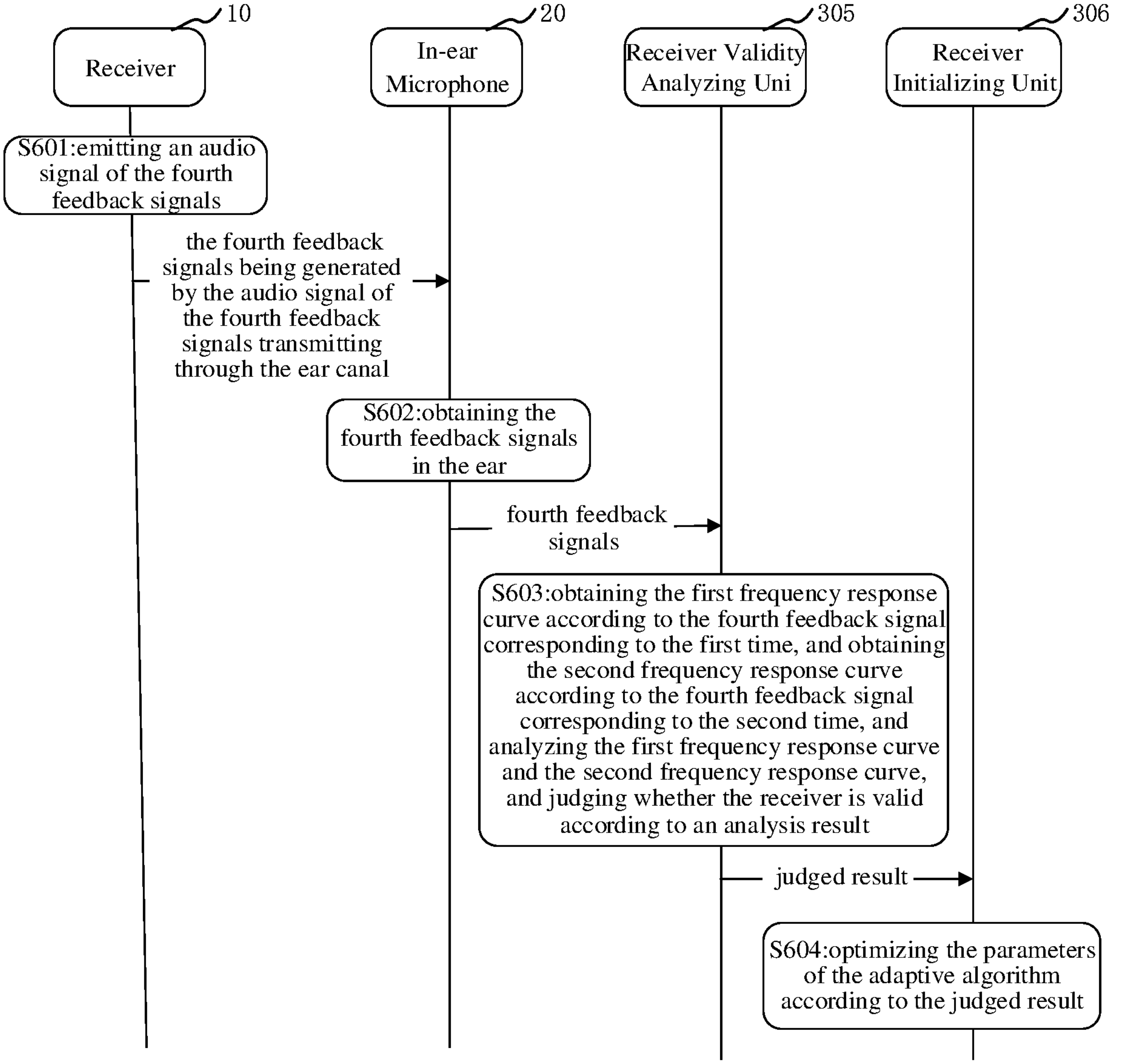
FIG. 7 is a schematic view showing a working process of judging receiver validity by the hearing device according to one of the embodiments of the present application.

Some possible embodiments of the present application will be specifically described hereafter with reference to FIG. 2 and FIG. 7, by taking the hearing device that performs a validity analysis for the receiver through the in-ear microphone as an example.

In one of the embodiments, the audio signal, when being transmitted to the in-ear microphone 20 through the ear canal, may generate corresponding fourth feedback signals, and the in-ear microphone 20 receives the fourth feedback signals. Moreover, the signal analyzing module 30 may include a receiver validity analyzing unit 305. The receiver validity analyzing unit 305 is configured to obtain at least a first frequency response curve and a second frequency response curve according to the fourth feedback signal corresponding to a first time and the fourth feedback signal corresponding to a second time, respectively, analyze the first frequency response curve and the second frequency response curve, and determine whether the receiver 10 is valid according to the analysis result.

The hearing device of the above embodiment may at least obtain the first frequency response curve according to the fourth feedback signal corresponding to the first time, and obtain the second frequency response curve according to the fourth feedback signal corresponding to the second time, thus realizing the validity analysis for the receiver 10 of the hearing device according to the first frequency response curve and the second frequency response curve.

It should be noted that the corresponding fourth feedback signals, generated by the transmission of the audio signal when the audio signal is transmitted to the in-ear microphone 20 through the ear canal, include the fourth feedback signal corresponding to the first time, which is generated by the mission of the audio signal emitted by the receiver 10 at the first time when the audio signal is transmitted to the in-ear microphone 20 through the ear canal, and include the fourth feedback signal corresponding to the second time, which is generated by the transmission of the audio signal emitted by the receiver 10 at the second time when the audio signal is transmitted to the in-ear microphone 20 through the ear canal.

It may be understood that the receiver validity analyzing unit 305 obtains at least the first frequency response curve and the second frequency response curve, according to the fourth feedback signal corresponding to the first time and the fourth feedback signal corresponding to the second time, respectively, but the number of fourth feedback signals, based on which the validity analyzing unit 305 judges whether the receiver 10 is valid, is not limited to the embodiments above. For example, the receiver validity analyzing unit 305 may obtain multiple frequency response curves according to the fourth feedback signals generated by the transmission of multiple audio signals when the multiple audio signals are transmitted to the in-ear microphone 20 through the ear canal, then analyzes the multiple frequency response curves, and judges whether receiver 10 is valid according to an analysis result. The validity analysis for the receiver unit 305 may also obtain multiple response curves of multiple preset frequencies or preset times according to the fourth feedback signals generated by the transmission of the frequency-sweep signal when the frequency-sweep signal is transmitted to the in-ear microphone 20 through the ear canal, then analyzes the multiple frequency response curves, and judges whether the receiver 10 is valid according to an analysis result.

A specific analyzing method for the first frequency response curve and the second frequency response curve is not limited in the present application. In one of the embodiments, a spectrum drift analysis may be performed according to the first frequency response curve and the second frequency response curve, that is, a real-time resonance frequency of the receiver 10 is determined by the first frequency response curve and the second frequency response curve, and it is determined whether the receiver 10 is valid automatically according to the real-time resonance frequency of the receiver 10.

In one of the embodiments, the audio signal, when being transmitted to the in-ear microphone 20 through the ear canal, may generate corresponding a fourth feedback signal, and the in-ear microphone 20 receives the fourth feedback signal. The receiver validity analyzing unit 305 of the signal analyzing module 30 is configured to obtain a frequency response curve according to the fourth feedback signal and compare the frequency response curve with a standard frequency response curve to determine whether the receiver 10 is valid. The standard frequency response curve may be obtained, for example, by experience.

Referring to FIG. 2 again, on the basis of the above embodiments, optionally, the signal analyzing module 30 may further include a receiver initializing unit 306. The receiver initializing unit 306 is connected to the receiver validity analyzing unit 305, and is configured to optimize the parameters of the adaptive algorithm according to a judgement result of the receiver validity analyzing unit 305.

As shown in FIG. 7, in the hearing device of the embodiment above, the receiver initializing unit 306 may optimize the parameters of the adaptive algorithm according to the judgement result of the receiver validity analyzing unit 305, and may make the same correction for the output signals of the receiver 10 according to an offset of the frequency response of the receiver 10, so as to avoid a reduction in the gain of the hearing device.

Referring to FIG. 7 again, in the hearing device of one of the embodiments of the present application, a process of calculating the ear canal feature information may include the following steps S601 to S604.

At step S601, the receiver 10 emits an audio signal.

At step S602, the in-ear microphone 20 obtains the fourth feedback signals in the ear, and the fourth feedback signals are generated by the transmission of the audio signal when the audio signal is transmitted through the ear canal.

At step S603, the receiver validity analyzing unit 305 obtains the first frequency response curve according to the fourth feedback signal corresponding to the first time, and obtains the second frequency response curve according to the fourth feedback signal corresponding to the second time, and analyzes the first frequency response curve and the second frequency response curve, and judges whether the receiver 10 is valid according to an analysis result.

At step S604, the receiver initializing unit 306 optimizes the parameters of the adaptive algorithm according to the judgement result of the receiver validity analyzing unit 305.

It should be noted that, the first time involved in the embodiment of the present application may be the time when the user uses the hearing device for the first time, or may be the time when the hearing device leaves a factory. The second time involved in the embodiment of the present application may be the time when the user starts the hearing device to use it each time, that is, each time the user starts to use the hearing device, the validity analysis is performed to determine whether an alarm is issued to the user or not, which is necessary for the user who relies on the hearing aid.

It should also be noted that, the signal analyzing module 30 may be any processor, for example a digital signal processor DSP. The specific structure of the signal analyzing module 30 is not limited in the embodiment of the present application. The signal analyzing module 30 may include any one or more of an in-ear-location detecting unit 301, a feedback control unit 302, an ear canal feature detecting unit 303, and the receiver validity analyzing unit 305.

A relative location relationship between the in-ear microphone 20 and the receiver 10 is not limited in the embodiment of the present application specifically. In one of the embodiments, as shown in FIG. 8, the in-ear microphone 20 may be fixed at a side of the receiver 10.

It can be understood that a specific type of the in-ear microphone 20 is not limited in the embodiment of the present application, and the in-ear microphone 20 may include, but is not limited to, a condenser microphone, a silicon microphone, or the like.

Figure 8:
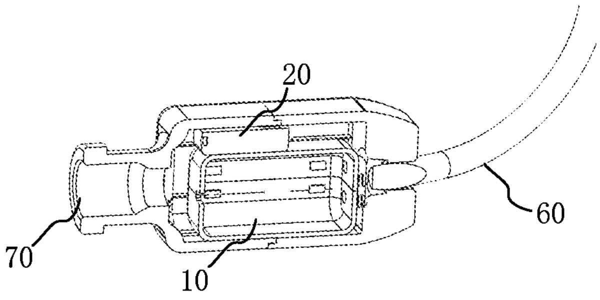
FIG. 8 is a schematic structural view of the hearing device of one of the embodiments of the present application.

In one of the embodiments, the in-ear microphone 20 is a side-opened silicon microphone, which is fixed at the side of the receiver 10, and as shown in FIG. 8, a facing direction of a sound hole of the side-opened silicon microphone and a facing direction of a sound hole of the receiver 10 are identical.

Referring to FIG. 8 again, in one of the embodiments, the hearing device may further include an acoustic tube 60, and the in-ear microphone 20 and the receiver 10 are both connected to the acoustic tube 60. Moreover, the in-ear microphone 20 and the receiver 10 may be both encapsulated in an encapsulating structure 70. The packaging structure 70 has an opening, and the sound hole of the side-opened silicon microphone and the sound hole of the receiver 10 both face the opening.

It can be understood that a specific type of the receiver 10 is not limited in the embodiment of the present application, and the receiver 10 may be, but is not limited to, a moving-iron receiver or a piezoelectric receiver, or the like.

In one of the embodiments, the over-ear microphone 50 may include a first over-ear microphone and a second over-ear microphone. Specifically, the first over-ear microphone and the second over-ear microphone are both connected to the signal analyzing module 30.

Figure 9:
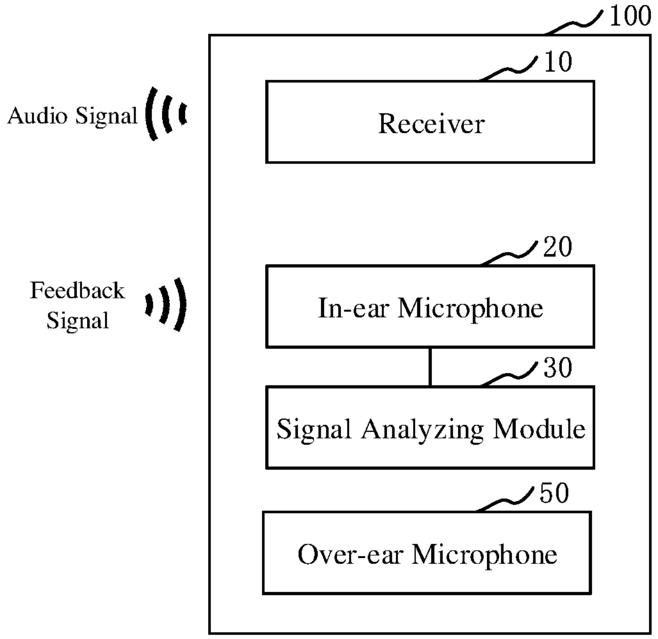
FIG. 9 is a schematic structural view showing the hearing device according to another embodiment of the present application.

The present application provides a hearing device according to some embodiments. Referring to FIG. 9, the hearing device may include a device body 100, a receiver 10, an in-ear microphone 20, an over-ear microphone 50, and a signal analyzing module 30.

Specifically, the receiver 10 may be configured to emit an audio signal, and the audio signal is reflected to form a feedback signal, and the audio signal, when being transmitted through the sound feedback, forms a sound feedback signal. The in-ear microphone 20 is arranged at a proximal end of the device body 100, and configured to receive the feedback signal above. The over-ear microphone 50 is arranged at a distal end of the device body 100, and configured to receive the sound feedback signal above. The signal analyzing module 30 is connected to the in-ear microphone 20 and the over-ear microphone 50, respectively, and configured to analyze the feedback signal and the sound feedback signal to obtain an analysis result.

The hearing device of the above embodiment is provided with the in-ear microphone 20 independent of the over-ear microphone 50. Through the in-ear microphone 20, the feedback signal formed by the reflection of the audio signal may be received in the ear, which enables the signal analyzing module 30 to analyze the feedback signal received in the ear and the sound feedback signal received by the over-ear microphone 50. When the hearing device is worn, the in-ear microphone 20 is located in the ear, and the received feedback signal is different from the sound feedback signal received by the over-ear microphone 50, therefore, a large amount of information, which cannot be obtained by the over-ear microphone 50, may be provided for the hearing device to analyze jointly. Compared with the analysis result obtained by analyzing only the sound feedback signal received by the over-ear microphone 50, the analysis result obtained by the hearing device of the embodiment above is more accurate.

The hearing device of the present application may include, but is not limited to, a hearing aid, an earphone of pass-through mode, or any other in-ear device, etc. Optionally, if the hearing device includes the hearing aid, the device body 100 includes a hearing aid body. If the hearing device includes the earphone of pass-through mode, the device body 100 includes an earphone body of pass-through mode.

It should be noted that, whether the hearing aid body or the earphone body of pass-through mode, a shape, a length, a width, a thickness, a material, thereof etc. may have different embodiments based on actual application scenes, and will not be described in detail in the embodiments of the present application.

It should also be noted that the proximal end of the device body 100 means a side of the device body 100 proximate to the ear canal, and the distal end of the device body 100 may mean a side of the device body 100 away from the ear canal.

Regarding the signal analyzing module 30, it should be noted that a specific method of analyzing the second feedback electrical signal and the sound feedback electrical signal by the signal analyzing module 30 is not limited in the embodiment of the present application. The method of analyzing the second feedback electrical signal and the sound feedback electrical signal by the signal analyzing module 30 may be understood by referring to the related technology, and will not be described in the present application again.

It should be noted that frequencies and amplitudes of the audio signal are not limited in the embodiment of the present application, and the audio signal may include, but is not limited to, an audio signal of a preset frequency or a frequency-sweep signal, etc. In one of the embodiments, the frequency of the audio signal is in a range of 50 Hz to 10 kHz, and/or the amplitude is lower than 20 dB. That is, the audio signal may satisfy that the frequency is in the range of 50 Hz to 10 kHz, or that the amplitude is lower than 20 dB, or that the frequency is in the range of 50 Hz to 10 kHz and the amplitude is lower than 20 dB.

Figure 10:
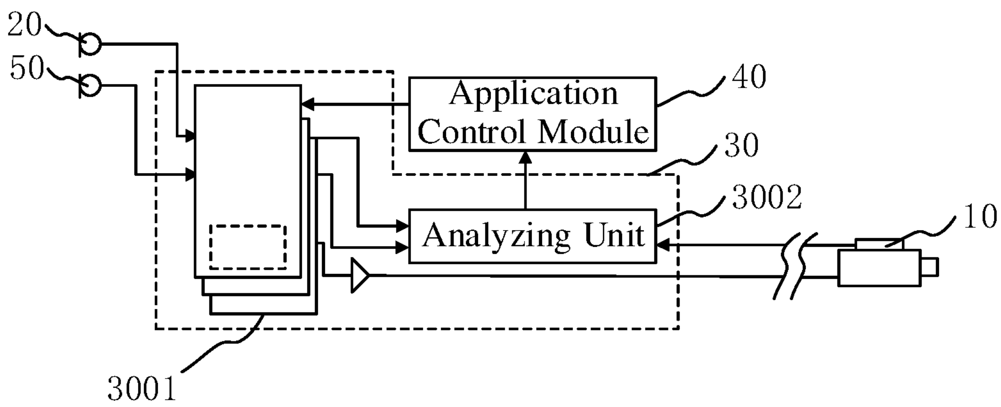
FIG. 10 is a circuit schematic diagram showing the hearing device according to another embodiment of the present application.

Referring to FIG. 9 and FIG. 10, in one of the embodiments, the signal analyzing module 30 may include a processing unit 3001 and an analyzing unit 3002. The processing unit 3001 is connected to the in-ear microphone 20 and the over-ear microphone 50, and is configured to digitally process the feedback signal collected by the in-ear microphone 20 to obtain the feedback electrical signal, and is configured to digitally process the sound feedback signal collected by the over-ear microphone 50 to obtain the sound feedback electrical signal. The analyzing unit 3002 is connected to the processing unit 3001, and is configured to analyze the feedback electrical signal and the sound feedback electrical signal to obtain the analysis result.

Regarding the analyzing unit 3002, it should be noted that a specific method of analyzing the feedback electrical signal and the sound feedback electrical signal by the analyzing unit 3002 is not limited in the embodiment of the present application. The method of analyzing the feedback electrical signal and the sound feedback electrical signal by the analyzing unit 3002 may be understood by referring to the related technology, and will not be described in the embodiment of the present application again.

Referring to FIG. 10 again, in one of the embodiments, the hearing device may further include an application control module 40. The application control module 40 is connected to the signal analyzing module 30 and configured to issue an application control instruction to a back-end circuit based on the analysis result obtained by the signal analyzing module 30. The application control module 40 may be any processor, for example an ARM7 microprocessor CONT.

In the hearing device of the above embodiment, the application control module 40 may control an application based on the analysis result of the signal analyzing module 30.

Regarding the application control module 40, it should be noted that a specific embodiment that the application control module 40 issues the application control instruction to the back-end circuit based on the analysis result obtained by the signal analyzing module 30 is not limited in the embodiment of the present application. The embodiment that the application control module 40 issues the application control instruction to the back-end circuit based on the analysis result obtained by the signal analyzing module 30 may be understood by referring to the related technology, and will not be described in the embodiment of the present application again.

Figure 11:
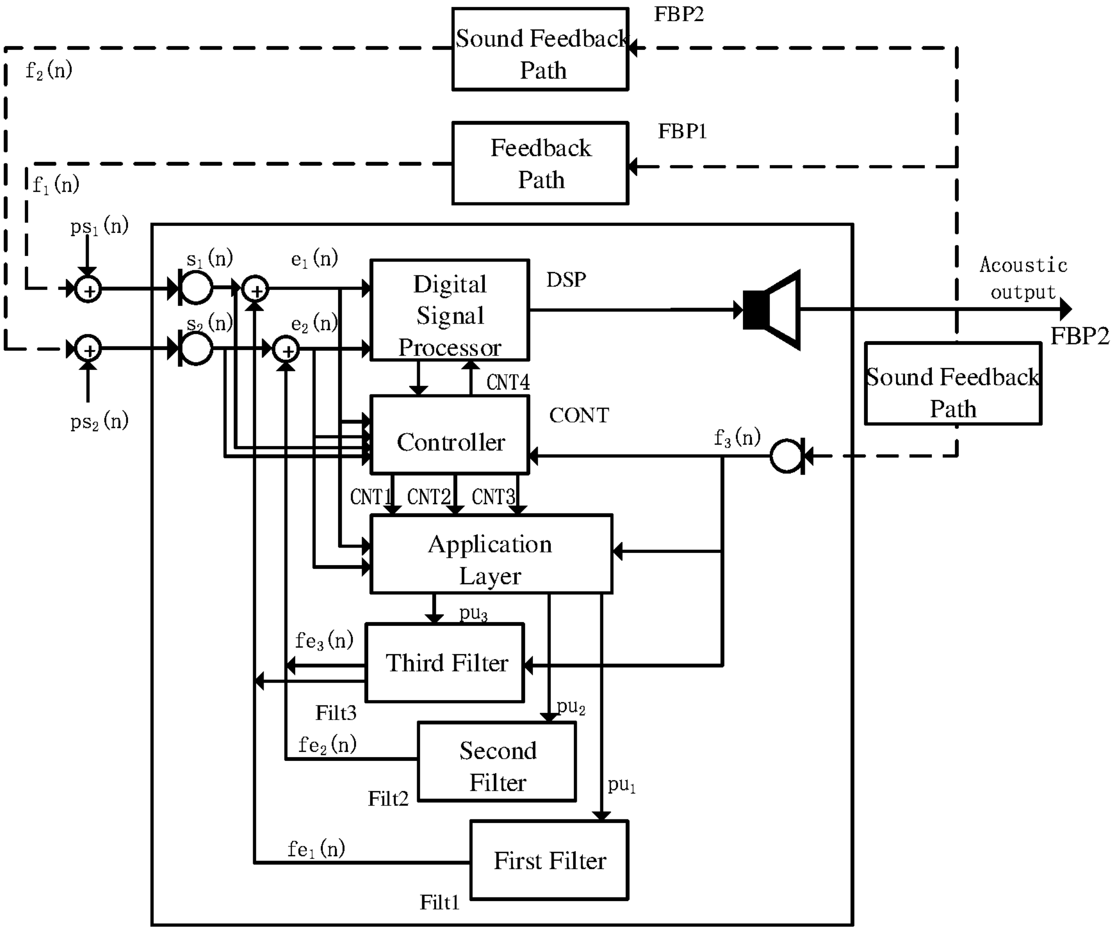
FIG. 11 is a schematic view showing signal paths of the hearing device according to another embodiment of the present application.

In one of the embodiments, signal paths during a working process of the hearing device may be shown in FIG. 11. The receiver 10 emits an audio signal. The audio signal passes through a feedback path FBP1, and then is compensated by a state probability parameter $PS_1(n)$ to obtain a feedback signal $S_1(n)$. In addition, the audio signal passes through a sound feedback path FBP2, and then is compensated by a state probability parameter $PS_2(n)$ to obtain a sound feedback signal $S_2(n)$. A noise reduction processing is performed on the feedback signal $S_1(n)$ and the sound feedback signal $S_2(n)$ to obtain a feedback signal error $e_1(n)$ and a sound feedback signal error $e_2(n)$, respectively, and the feedback signal error $e_1(n)$ and the sound feedback signal error $e_2(n)$ are used as input signals of the signal analyzing module 30. The signal analyzing module 30 may include a digital signal processor DSP. The digital signal processor DSP receives the feedback signal error $e_1(n)$ and the sound feedback signal error $e_2(n)$, and analyzes feedback signal error $e_1(n)$ and the sound feedback signal error $e_2(n)$ to get an analysis result. The application control module 40 may include a controller CONT configured to issue an application control instruction to the application layer according to the analysis result. Moreover, the hearing device of the present application may further include at least a first filter Filt1, a second filter Filt2 and a third filter Filt3, which may be used to optimize parameters of an adaptive algorithm.

Some possible embodiments of the present application will be specifically described hereinafter, by taking the hearing device that implements an in-ear-location detection function through the in-ear microphone 20 as an example.

It should be noted that the first feedback signal, the second feedback signal, the third feedback signal, and the fourth feedback signal in the embodiment of the present application each are one of the feedback signals.

In one of the embodiments, the audio signal emitted by the receiver 10 may include an audio signal of a first preset frequency. The audio signal of the first preset frequency is reflected by eardrum to form a first feedback signal. Moreover, the signal analyzing module 30 may include an in-ear-location detecting unit 301, and the in-ear-location detecting unit 301 is configured to analyze the first feedback signal to determine whether the hearing device is in the ear.

If the hearing device is placed in the ear, in the hearing device of the above embodiment, the audio signal of the first preset frequency emitted by the receiver 10 is reflected by the eardrum to form the first feedback signal. The in-ear microphone 20 of the hearing device may obtain the first feedback signal in the ear, so that the in-ear-location detecting unit 301 may analyze the first feedback signal obtained by the in-ear microphone 20 to determine whether the hearing device is in the ear. Compared with the hearing device receiving only the signals through the over-ear microphone 50, the hearing device according to the embodiment can collect the feedback signals better, thereby improving the accuracy of the in-ear-location detection.

Optionally, the audio signal of the first preset frequency is a weak audio signal. The magnitude of the first preset frequency is related to geometry shapes of ear canals and/or of eardrums and elastic modulus of the eardrums of different individuals, and a mean of the values in the human hearing range may be used as a basis of a simulation or a basis of some other algorithms, to calculate a range of the first preset frequency. In the embodiment of the present application, the magnitude of the first preset frequency may be adjusted finely according to individual differences. In one embodiment, the frequency of the audio signal of the first preset frequency is in a range of 50 Hz to 10 kHz, and the amplitude is lower than 20 dB.

The receiver 10 in an off-ear state may emit the audio signal at the first preset frequency. When the receiver 10 is placed in the ear, the audio signal of the first preset frequency may be reflected by the eardrum to form the first feedback signal. The receiver 10 may continuously emit the audio signal at the first preset frequency, or may regularly emit the audio signal at the first preset frequency and continuously send the audio signal for a preset time period, which is not limited in the embodiment of the present application.

In the embodiment of the present application, the specific method, by which the in-ear-location detecting unit 301 analyzes the first feedback signal and judges whether the hearing device is in the ear, is not limited. In one of the embodiments, the in-ear-location detecting unit 301 may compare the first feedback signal with a reflection signal formed in the off-ear state by the reflection of the audio signal of the first preset frequency, so as to determine whether the hearing device is in the ear.

In addition, in some possible embodiments, the in-ear-location detecting unit 301 may also determine whether the hearing device is correctly worn according to an energy value of the first feedback signal received in the ear. For example, when the hearing device is correctly worn, the receiver 10 is placed in the ear, and a range of the energy value of the first feedback signal, formed by reflecting the audio signal of the first preset frequency through the eardrum, is defined as a standard feedback range. During an in-ear-location detection, if the in-ear-location detecting unit 301 detects that the energy value of the first feedback signal is beyond the standard feedback range, it is determined that the hearing device is not correctly worn at this time.

As mentioned above, in order to estimate the sound feedback path, the audio signal emitted from the receiver 10 and the signal collected by the over-ear microphone of the hearing device need to be known, and a ratio of the audio signal emitted by the receiver to the signal collected by the over-ear microphone is a transfer function of the sound feedback path. In the related technology, the audio signal emitted from the receiver 10 is generally estimated by a driving signal of the receiver. However, due to a nonlinear relationship between the driving signal of the receiver 10 and the audio signal emitted by the receiver 10, and due to the relative long feedback path, a problem of inaccurate estimation may easily occur, which will affect the feedback inhibition effect.

Some possible embodiments of the present application will be specifically described hereinafter, by taking the hearing device that estimates a transfer function of the feedback path through the in-ear microphone 20 and the over-ear microphone 50 as an example.

In one of the embodiments, the audio signal emitted by the receiver 10 may include the audio signal of the second preset frequency. The audio signal of the second preset frequency, when being transmitted to the in-ear microphone 20 through the ear canal, generates the second feedback signal, and the in-ear microphone 20 obtains the second feedback signal. At the same time, the audio signal of the second preset frequency, when being transmitted to the over-ear microphone 50 through the ear canal, generates the sound feedback signal, and the over-ear microphone 50 obtains the sound feedback signal. Moreover, the signal analyzing module 30 may include a feedback control unit. Based on the second feedback signal received by the in-ear microphone 20 and the sound feedback signal received by the over-ear microphone 50, the feedback control unit 302 may jointly estimate and determine the transfer function of the feedback path.

In the hearing device of the above embodiment, the audio signal of the second preset frequency emitted by the receiver 10 is transmitted through the ear canal to generate the second feedback signal and the sound feedback signal, and the in-ear microphone 20 of the hearing device may receive the second feedback signal in the ear. Compared with the signals collected by the original microphone of the hearing device, the signals received and obtained by the present application need the relatively short feedback path, which will not cause the problem of inaccurate estimation easily. Moreover, the analysis is performed by combining the second feedback signal with the sound feedback signal received by the over-ear microphone 50, thereby further improving the accuracy of the transfer function of the feedback path determined by the feedback control unit 302.

Specifically, since the in-ear microphone 20 is arranged to be adjacent to the receiver 10, the second feedback signal received by the in-ear microphone 20 in the ear may be regarded to be approximate to a real-time output signal of the receiver 10. The signal received by the over-ear microphone 50 is the sound feedback signal generated by transmission of the audio signal of the second preset frequency when the audio signal of the second preset frequency passes through the sound feedback path of the ear canal. An analysis is performed by combining the second feedback signal with the sound feedback signal received by the over-ear microphone 50, thereby realizing a more accurate feedback inhibition function, and preventing the nonlinear relationship between the audio signal emitted by the receiver 10 and the driving signal of the receiver 10 from affecting the realization of the feedback inhibition function.

That is to say, in the hearing device of the above embodiment, the audio signal actually emitted by the receiver 10 is estimated based on the second feedback signal, which is acquired by the in-ear microphone 20 after the audio signal of the second preset frequency emitted by the receiver 10 is transmitted. The result obtained by such an estimation is more accurate, and eliminates a possible impact of nonlinear factors (such as a pulse density modulation driving, a digital-to-analog conversion and/or a D-typed amplifier, etc.) during estimation of the feedback path on the estimation of the feedback path.

Some possible embodiments of the present application will be specifically described hereinafter, by taking the hearing device that acquires ear canal feature information through the in-ear microphone 20 as an example.

In one of the embodiments, the audio signal emitted by the receiver 10 may include a frequency-sweep signal. The frequency-sweep signal is reflected by the ear canal to form a third feedback signal. Moreover, the signal analyzing module 30 may include an ear canal feature detecting unit 303. The ear canal feature detecting unit 303 is configured to acquire the ear canal feature information based on the third feedback signal.

The frequency-sweep signal emitted by the hearing device of the above embodiment is reflected by the ear canal to form the third feedback signal, and the in-ear microphone 20 of the hearing device obtains the third feedback signal in the ear, so that the ear canal feature detecting unit 303 may acquire the ear canal feature information based on the third feedback signal received by the in-ear microphone 20 in the ear, to analyze the shape of the ear canal.

It may be understood that specific types of the ear canal feature information are not limited in the embodiment of the present application. The ear canal feature information involved in the embodiment of the present application may include, but is not limited to, one or more of the geometric size of the ear canal, the shape of the ear canal, the bending direction of the ear canal, a volume of the ear canal, and the frequency response of the ear canal, etc.

It should be noted that the frequency-sweep signal involved in the present application may include an audio signal, which is designed for testing and is in a preset frequency band, and the frequency of the audio signal continuously changes from high to low/from low to high. A specific range of the preset frequency band is not limited in the present application. In one of the embodiments, the preset frequency band ranges from 50 Hz to 10 kHz, and the amplitude is lower than 20 dB.

In one of the embodiments, the frequency-sweep signal emitted by the receiver 10 includes scanning signals in multiple directions.

The scanning signals in multiple directions emitted by the hearing device of the embodiment above are reflected in the ear canal to form the third feedback signals in different directions. The in-ear microphone 20 of the hearing device receives these third feedback signals in different directions in the ear, so that the ear canal feature detecting unit 303 can analyze the feature information of the ear canal according to the third feedback signals in different directions received in the ear and can achieve a high accuracy.

Optionally, the frequency-sweep signal may be emitted by the receiver 10 when the hearing device is placed into the ear for the first time.

Some possible embodiments of the present application will be specifically described hereafter, by taking the hearing device that performs a validity analysis for the receiver 10 through the in-ear microphone 20 as an example.

In one of the embodiments, the audio signal, when being transmitted to the in-ear microphone 20 through the ear canal, may generate corresponding fourth feedback signals. Moreover, the signal analyzing module 30 may include a receiver validity analyzing unit 305. The receiver validity analyzing unit 305 is configured to obtain at least a first frequency response curve and a second frequency response curve according to the fourth feedback signal corresponding to a first time and the fourth feedback signal corresponding to a second time, respectively, analyze the first frequency response curve and the second frequency response curve, and determine whether the receiver 10 is valid according to the analysis result.

The hearing device of the above embodiment may at least obtain the first frequency response curve according to the fourth feedback signal corresponding to the first time, and obtain the second frequency response curve according to the fourth feedback signal corresponding to the second time, thus realizing the validity analysis for the receiver 10 of the hearing device according to the first frequency response curve and the second frequency response curve.

It should be noted that the corresponding fourth feedback signals, generated by the transmission of the audio signal when the audio signal is transmitted to the in-ear microphone 20 through the ear canal, include the fourth feedback signal corresponding to the first time, which is generated by the transmission of the audio signal emitted by the receiver 10 at the first time when the audio signal is transmitted to the in-ear microphone 20 through the ear canal, and include the fourth feedback signal corresponding to the second time, which is generated by the transmission of the audio signal emitted by the receiver 10 at the second time when the audio signal is transmitted to the in-ear microphone 20 through the ear canal.

It may be understood that the receiver validity analyzing unit 305 obtains at least the first frequency response curve and the second frequency response curve, according to the fourth feedback signal corresponding to the first time and the fourth feedback signal corresponding to the second time, respectively, but the number of fourth feedback signals, based on which the validity analyzing unit 305 judges whether the receiver 10 is valid, is not limited to the embodiments above. For example, the receiver validity analyzing unit 305 may obtain multiple frequency response curves according to the fourth feedback signals generated by the transmission of multiple different audio signals when the audio signals are transmitted to the in-ear microphone 20 through the ear canal, then analyze the multiple frequency response curves, and judge whether receiver 10 is valid according to an analysis result. The validity analysis for the receiver unit 305 may also obtain response curves of multiple preset frequencies or preset times according to the fourth feedback signals generated by the transmission of the frequency-sweep signal when the frequency-sweep signal is transmitted to the in-ear microphone 20 through the ear canal, then analyze the multiple frequency response curves, and judge whether the receiver 10 is valid according to an analysis result.

A specific analyzing method for the first frequency response curve and the second frequency response curve is not limited in the embodiment of the present application. In one of the embodiments, a spectrum drift analysis may be performed according to the first frequency response curve and the second frequency response curve, thus realizing the analysis for the first frequency response curve and the second frequency response curve.

It should be noted that, the first time involved in the embodiment of the present application may be the time when the user uses the hearing device for the first time, or may be the time when the hearing device leaves a factory. The second time involved in the embodiment of the present application may be the time when the user starts the hearing device to use it each time, that is, each time the user starts to use the hearing device, the validity analysis is performed to determine whether an alarm is issued to the user or not, which is necessary for the user who relies on the hearing aid.

It should also be noted that the specific structure of the signal analyzing module 30 is not limited in the embodiment of the present application. The signal analyzing module 30 may include any one or more of an in-ear-location detecting unit 301, a feedback control unit 302, an ear canal feature detecting unit 303, and the receiver validity analyzing unit 305.

A relative location relationship between the in-ear microphone 20 and the receiver 10 is not limited in the embodiment of the present application specifically. In one of the embodiments, as shown in FIG. 8, the in-ear microphone 20 may be fixed at a side of the receiver 10.

It can be understood that a specific type of the in-ear microphone 20 is not limited in the embodiment of the present application, and the in-ear microphone 20 may include, but is not limited to, a condenser microphone, a silicon microphone, or the like.

In one of the embodiments, the in-ear microphone 20 is a side-opened silicon microphone, which is fixed at the side of the receiver 10, and as shown in FIG. 8, a facing direction of a sound hole of the side-opened silicon microphone and a facing direction of a sound hole of the receiver 10 are identical.

Referring to FIG. 8 again, in one of the embodiments, the hearing device may further include an acoustic tube 60, and the in-ear microphone 20 and the receiver 10 are both connected to the acoustic tube 60. Moreover, the in-ear microphone 20 and the receiver 10 may be both encapsulate in an encapsulating structure 70. The encapsulating structure 70 has an opening, and the sound hole of the side-opened silicon microphone and the sound hole of the receiver 10 both face the opening.

It can be understood that a specific type of the receiver 10 is not limited in the embodiment of the present application, and the receiver 10 may be, but is not limited to, a moving-iron receiver or a piezoelectric receiver, or the like.

In one of the embodiments, the over-ear microphone 50 may include a first over-ear microphone and a second over-ear microphone. Specifically, the first over-ear microphone and the second over-ear microphone are both connected to the signal analyzing module 30.

A person of ordinary skill in the art should understand that all or part of the processes in the above embodiments may be implemented by means of a computer program instructing relevant hardware. The computer program may be stored in a non-volatile computer readable storage medium. When the computer program is executed, it may include the procedures of the embodiments above. Where, any reference to the memory, the storage, the database or other medium used in the embodiments provided by the present application may include at least one of non-transitory memory and transitory memory. The non-transitory memory may include read-only memory (ROM), magnetic tape, floppy disk, flash memory, or optical memory. The transitory memory may include random access memory (RAM) or external cache memory. As an illustration but not a limitation, RAM can be in various forms, such as static random access memory (SRAM) or dynamic random access memory (DRAM), etc.

In the description of the specification, the description of reference terms "in one of the embodiments", "some embodiments", "possible embodiments", etc. mean that a specific feature, a structure, a material, or a feature described with reference to the embodiments or exemplary description are included in at least one embodiment or example of the present application. In the specification, the illustrative description of the above terms does not necessarily refer to the same embodiment or example.

The technical features of the embodiments above may be combined arbitrarily. In order to make the description concise, not all possible combinations of various technical features in the embodiments above are described. However, as long as there are no contradictions between the combinations of these technical features, all the combinations should be within the scope of the present specification.

The above-described embodiments are merely several illustrative embodiments of the present application, and the description thereof is more specific and detailed, but these embodiments should not be understood to limit the scope of the invention. It should be noted that various deformations and modifications may be made by those skilled in the art without departing from the concepts of the present application, and the various deformations and modifications belong to the protection scope of the present application. Therefore, the protection scope of the present application should be determined by the appended claims.

What is claimed is:

1. A hearing device, comprising:

a device body;

an over-ear microphone;

a receiver, configured to emit an audio signal, the audio signal comprising an audio signal of a second preset frequency; the audio signal being reflected to form a feedback signal comprising: the audio signal of the second preset frequency, when being transmitted to an in-ear microphone through an ear canal, generating a second feedback signal; and the audio signal of the second preset frequency, when being transmitted to the over-ear microphone through the ear canal, generating a sound feedback signal; the over-ear microphone being configured to receive the sound feedback signal;

the in-ear microphone, arranged at a proximal end of the device body and configured to receive the feedback signal, the proximal end of the device body being proximate to the ear canal; and a signal analyzing module, comprising a feedback control unit and connected to the in-ear microphone; and the signal analyzing module being configured to analyze the feedback signal to obtain an analysis result comprising: the feedback control unit being configured to estimate and determine a transfer function of a feedback path based on the second feedback signal received by the in-ear microphone and the sound feedback signal received by the over-ear microphone.

2. The hearing device according to claim 1, wherein the audio signal further comprises an audio signal of a first preset frequency;

the audio signal being reflected to form the feedback signal further comprises: the audio signal of the first preset frequency being reflected by an eardrum to form a first feedback signal;

the signal analyzing module comprises an in-ear-location detecting unit; and the signal analyzing module being configured to analyze the feedback signal to obtain the analysis result further comprises: the in-ear-location detecting unit being configured to analyze the first feedback signal to determine whether the hearing device is in an ear.

3. The hearing device according to claim 2, further comprising an application control module, wherein the application control module is connected to the in-ear-location detecting unit, and configured to issue an application control instruction to a back-end circuit based on a judgement result of determining, by the in-ear-location detecting unit, whether the hearing device is in the ear.

4. The hearing device according to claim 1, wherein the over-ear microphone is arranged at a distal end of the device body; and the signal analyzing module is connected to the over-ear microphone, and configured to analyze the feedback signal and the sound feedback signal to obtain another analysis result.

5. The hearing device according to claim 4, wherein:

the signal analyzing module comprises a processing unit and an analyzing unit;

the processing unit is connected to the in-ear microphone and the over-ear microphone, and is configured to digitally process the feedback signal collected by the in-ear microphone to obtain a feedback electrical signal, and is configured to digitally process the sound feedback signal collected by the over-ear microphone to obtain a sound feedback electrical signal; and the analyzing unit is connected to the processing unit, and is configured to analyze the feedback electrical signal and the sound feedback electrical signal to obtain the other analysis result.

6. The hearing device according to claim 4, further comprising an application control module, wherein the application control module is connected to the signal analyzing module, and is configured to issue an application control instruction to a back-end circuit according to the other analysis result of the signal analyzing module.

7. The hearing device according to claim 6, wherein the application control module comprises a controller configured to issue an application control instruction to the back-end circuit.

8. The hearing device according to claim 4, wherein:

the over-ear microphone comprises a first over-ear microphone and a second over-ear microphone; and the first over-ear microphone and the second over-ear microphone are both connected to the signal analyzing module.

9. The hearing device according to claim 4, wherein:

the audio signal transmitted through a feedback path is compensated by a first state probability parameter to obtain the feedback signal; and the audio signal transmitted through the sound feedback path is compensated by a second state probability parameter to obtain the sound feedback signal.

10. A hearing device, comprising:

a device body;

a receiver, configured to emit an audio signal, the audio signal comprising a frequency-sweep signal; the frequency-sweep signal comprising scanning signals in multiple directions; the frequency-sweep signal being emitted when the receiver is placed in an ear for the first time; and the audio signal being reflected to form a feedback signal comprising: the frequency-sweep signal being reflected by an ear canal to form a third feedback signal;

an in-ear microphone, arranged at a proximal end of the device body and configured to receive the feedback signal, the proximal end of the device body being proximate to the ear canal; and a signal analyzing module, connected to the in-ear microphone and comprising an ear canal feature detecting unit; and the signal analyzing module being configured to analyze the feedback signal to obtain an analysis result comprising: the ear canal feature detecting unit being configured to obtain ear canal feature information based on the third feedback signal.

11. A hearing device, comprising:

a device body;

a receiver, configured to emit an audio signal, the audio signal being reflected to form a feedback signal comprising: the audio signal, when being transmitted to the in-ear microphone through the ear canal, generating fourth feedback signals;

an in-ear microphone, arranged at a proximal end of the device body and configured to receive the feedback signal, the proximal end of the device body being proximate to an ear canal; and a signal analyzing module, comprising a receiver validity analyzing unit and connected to the in-ear microphone, and the signal analyzing module being configured to analyze the feedback signal to obtain an analysis result comprising: the receiver validity analyzing unit being configured to obtain at least a first frequency response curve and a second frequency response curve according to a fourth feedback signal corresponding to a first time and a fourth feedback signal corresponding to a second time, respectively, to analyze the first frequency response curve and the second frequency response curve, and to determine whether the receiver is valid according to the analysis result.

12. The hearing device according to claim 11, wherein the receiver validity analyzing unit being configured to analyze the first frequency response curve and the second frequency response curve comprises: the receiver validity analyzing unit being configured to perform a spectrum drift analysis according to the first frequency response curve and the second frequency response curve.

13. The hearing device according to claim 11, wherein the signal analyzing module further comprises a receiver initializing unit;

the receiver initializing unit is connected to the receiver validity analyzing unit, and configured to optimize parameters of an adaptive algorithm according to a judgement result of the receiver validity analyzing unit.

14. A hearing device, comprising:

a device body;

a receiver, configured to emit an audio signal, the audio signal being reflected to form a feedback signal comprising: the audio signal, when being transmitted to an in-ear microphone through an ear canal, generating a fourth feedback signal;

the in-ear microphone, arranged at a proximal end of the device body and configured to receive the feedback signal, the proximal end of the device body being proximate to the ear canal; and a signal analyzing module, comprising a receiver validity analyzing unit and connected to the in-ear microphone; and the signal analyzing module being configured to analyze the feedback signal to obtain an analysis result comprising: the receiver validity analyzing unit being configured to obtain a frequency response curve according to the fourth feedback signal and compare the frequency response curve with a standard frequency response curve to determine whether the receiver is valid.

15. A hearing device, comprising:

a device body;

a receiver, configured to emit an audio signal, the audio signal being reflected to form a feedback signal;

an in-ear microphone, arranged at a proximal end of the device body and configured to receive the feedback signal and comprising a side-opened silicon microphone, the proximal end of the device body being proximate to an ear canal; the side-opened silicon microphone being fixed at a side of the receiver; a facing direction of a sound hole of the side-opened silicon microphone and a facing direction of a sound hole of the receiver being identical;

an acoustic tube, the in-ear microphone and the receiver being both connected to the acoustic tube; the in-ear microphone and the receiver being both encapsulated in an encapsulating structure; the encapsulating structure having an opening, and the sound hole of the side-opened silicon microphone and the sound hole of the receiver both facing the opening; and a signal analyzing module, connected to the in-ear microphone and configured to analyze the feedback signal to obtain an analysis result.

* * * * *